United States Patent
Zebuhr et al.

(10) Patent No.: US 6,714,188 B1
(45) Date of Patent: *Mar. 30, 2004

(54) STICK TO ERGONOMICALLY MANIPULATE MOUSE BUTTONS

(75) Inventors: William Zebuhr, Nashua, NH (US); Wesley Edwin Shattuck, Derry, NH (US)

(73) Assignee: An Ounce of Invention, INC, Derry, NH (US)

( * ) Notice: Subject to any disclaimer, the term of this patent is extended or adjusted under 35 U.S.C. 154(b) by 322 days.

This patent is subject to a terminal disclaimer.

(21) Appl. No.: 09/748,349

(22) Filed: Dec. 26, 2000

Related U.S. Application Data

(63) Continuation-in-part of application No. 09/330,917, filed on Jun. 11, 1999, now Pat. No. 6,417,842.
(60) Provisional application No. 60/172,089, filed on Dec. 23, 1999, and provisional application No. 60/233,695, filed on Sep. 19, 2000.

(51) Int. Cl.[7] .................................................. G09G 5/08
(52) U.S. Cl. ....................................... 345/163; 345/161
(58) Field of Search ................................. 345/156, 157, 345/161, 163–166, 179; 248/918

(56) References Cited

U.S. PATENT DOCUMENTS

| | | | |
|---|---|---|---|
| 4,780,707 A | 10/1988 | Selker | |
| 4,862,165 A | 8/1989 | Gart | |
| 5,006,836 A | 4/1991 | Cooper | |
| 5,268,674 A | 12/1993 | Howard et al. | |
| 5,355,148 A | 10/1994 | Anderson | |
| 5,576,733 A | 11/1996 | Lo | |
| 5,754,126 A | 5/1998 | Hillbrink et al. | |
| 5,754,168 A * | 5/1998 | Maynard, Jr. | 345/163 |
| 5,805,143 A * | 9/1998 | Myers | 345/163 |
| 5,880,715 A | 3/1999 | Garrett | |
| 5,883,690 A | 3/1999 | Meyers et al. | |
| 5,894,302 A * | 4/1999 | Scenna et al. | 345/163 |
| 6,031,522 A * | 2/2000 | Strand | 345/163 |
| 6,204,838 B1 * | 3/2001 | Wang et al. | 345/161 |
| 6,208,328 B1 * | 3/2001 | Kawachiya et al. | 345/157 |
| 6,304,249 B1 * | 10/2001 | Derocher et al. | 345/163 |
| 6,417,842 B1 * | 7/2002 | Shattuck | 345/163 |
| 6,480,184 B1 * | 11/2002 | Price | 345/163 |
| 2002/0196231 A1 * | 12/2002 | Dobies et al. | 345/161 |

* cited by examiner

Primary Examiner—Amr Awad
(74) Attorney, Agent, or Firm—Maine & Asmus

(57) ABSTRACT

An ergonomic mouse accessory that allows the user to easily manipulate the control buttons of the mouse with a variety of hand positions and varying movements, thereby reducing or eliminating repetitive strain injuries and increasing accessibility to those unable to operate a standard mouse. In one embodiment a sleeve is positioned over the front of the mouse and a click stick is secured to the sleeve so that the lower end of the stick contacts the mouse button while the majority of the stick protrudes above the sleeve. Striking the stick produces a lever and fulcrum action, wherein the connection of the stick at the point of contact with the sleeve acts as a pivot point and causes the lower end of the stick to depress the mouse button. A spring means can be used to return the stick to the fully vertical position. Other embodiments include a cup that is attachable to a mouse button with a stick extending from the cup, and a plate embodiment that engages the mouse and permits the stick to manipulate the mouse buttons.

18 Claims, 14 Drawing Sheets

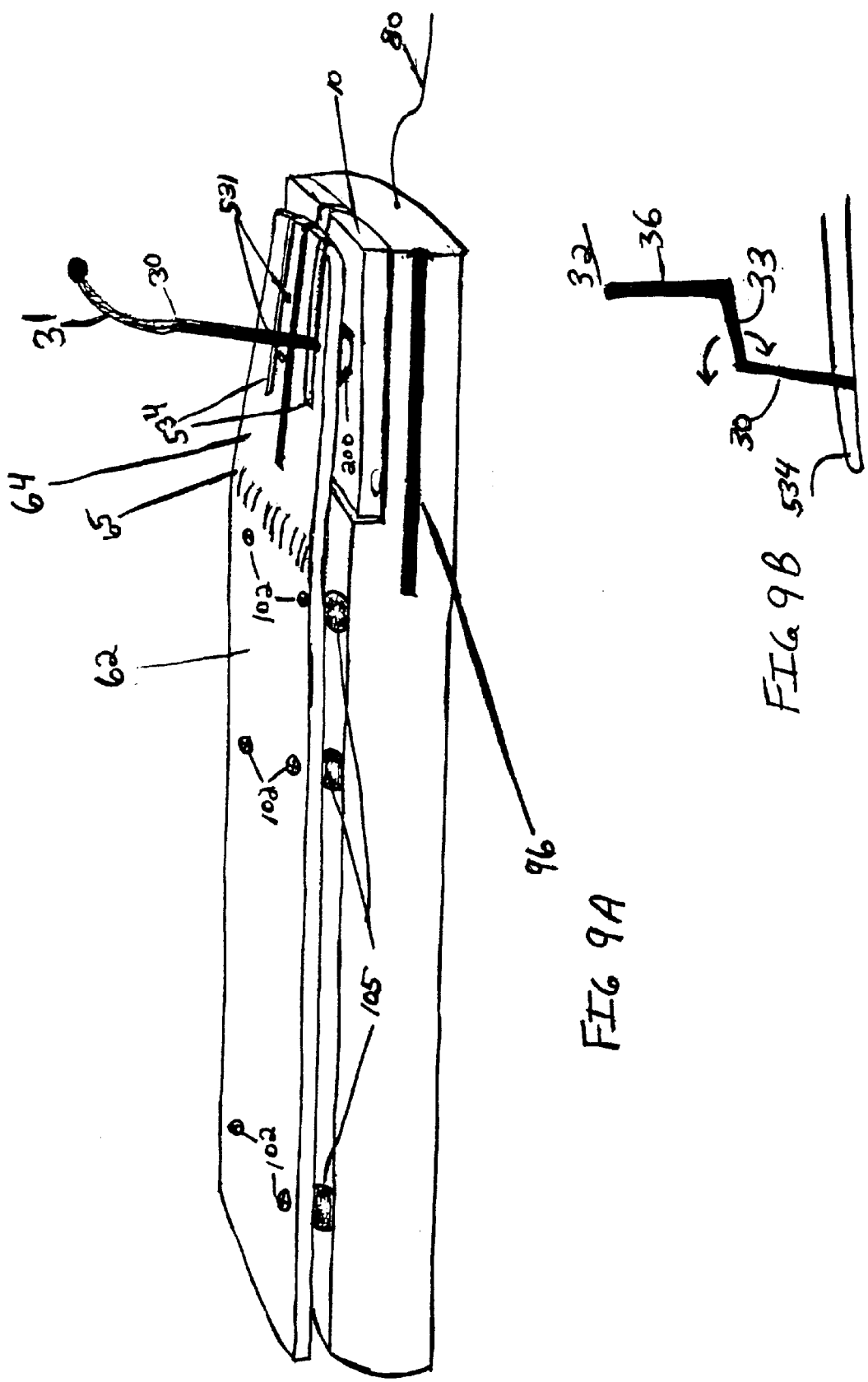

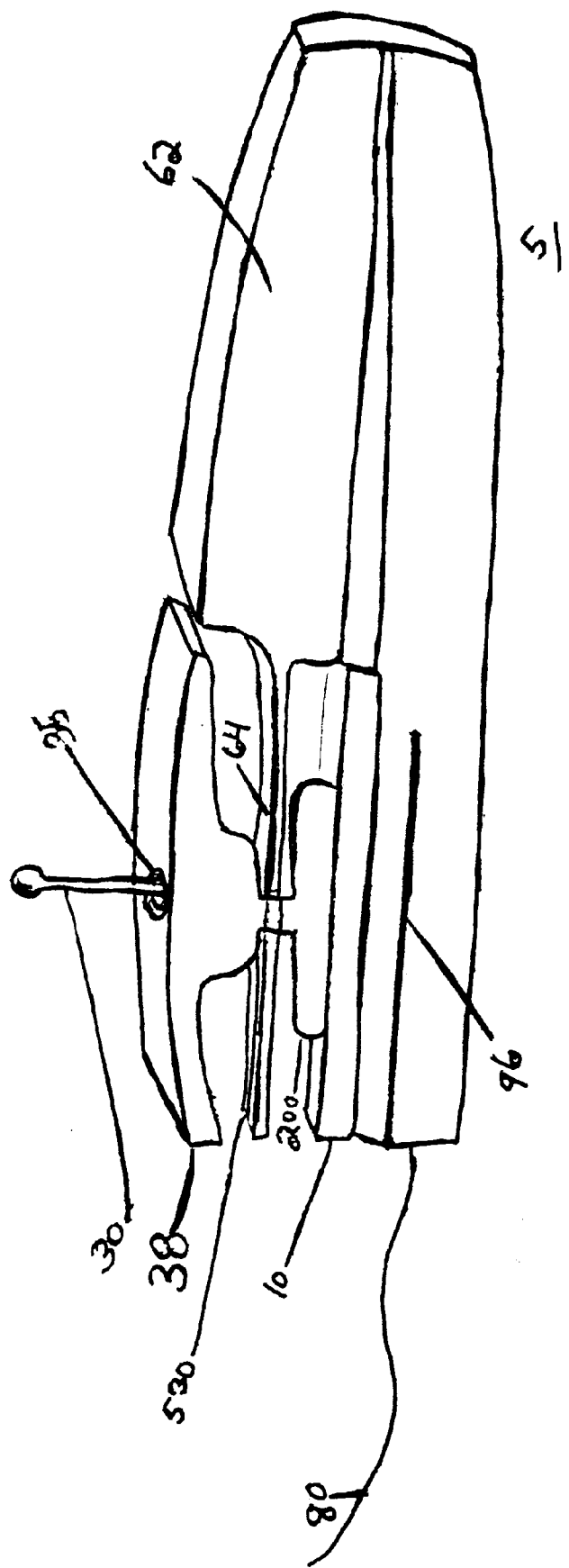

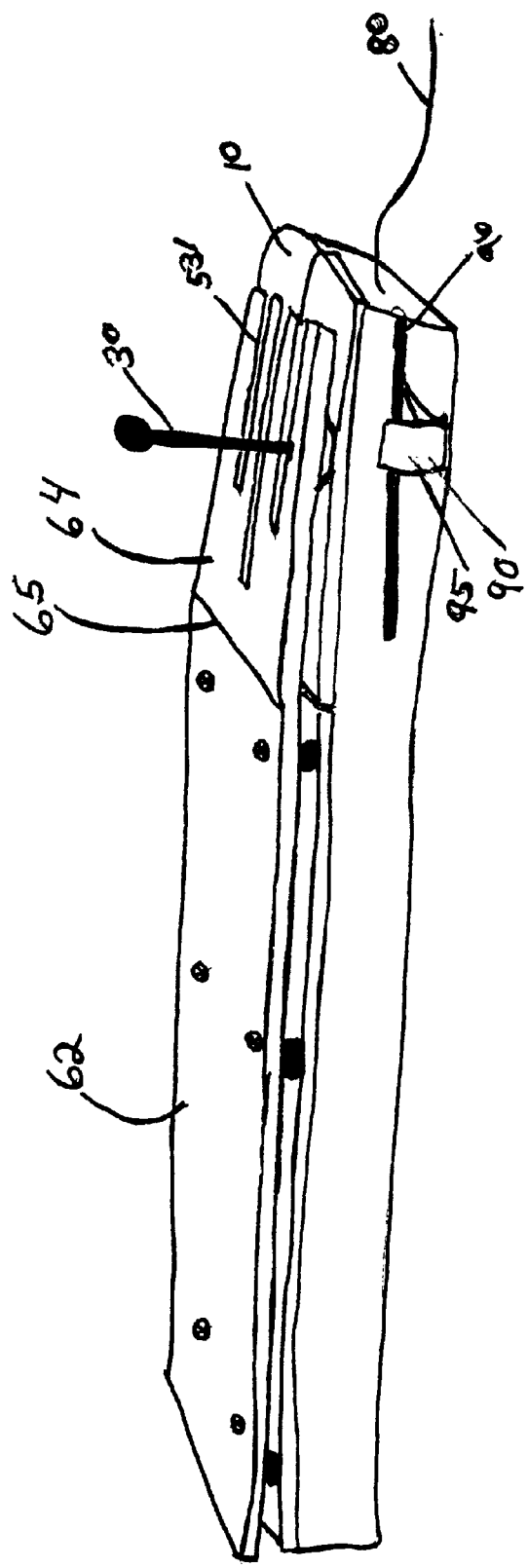
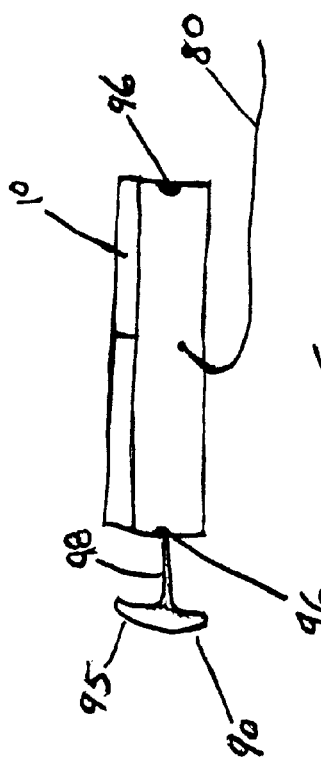
FIG 11A
FIG 11B

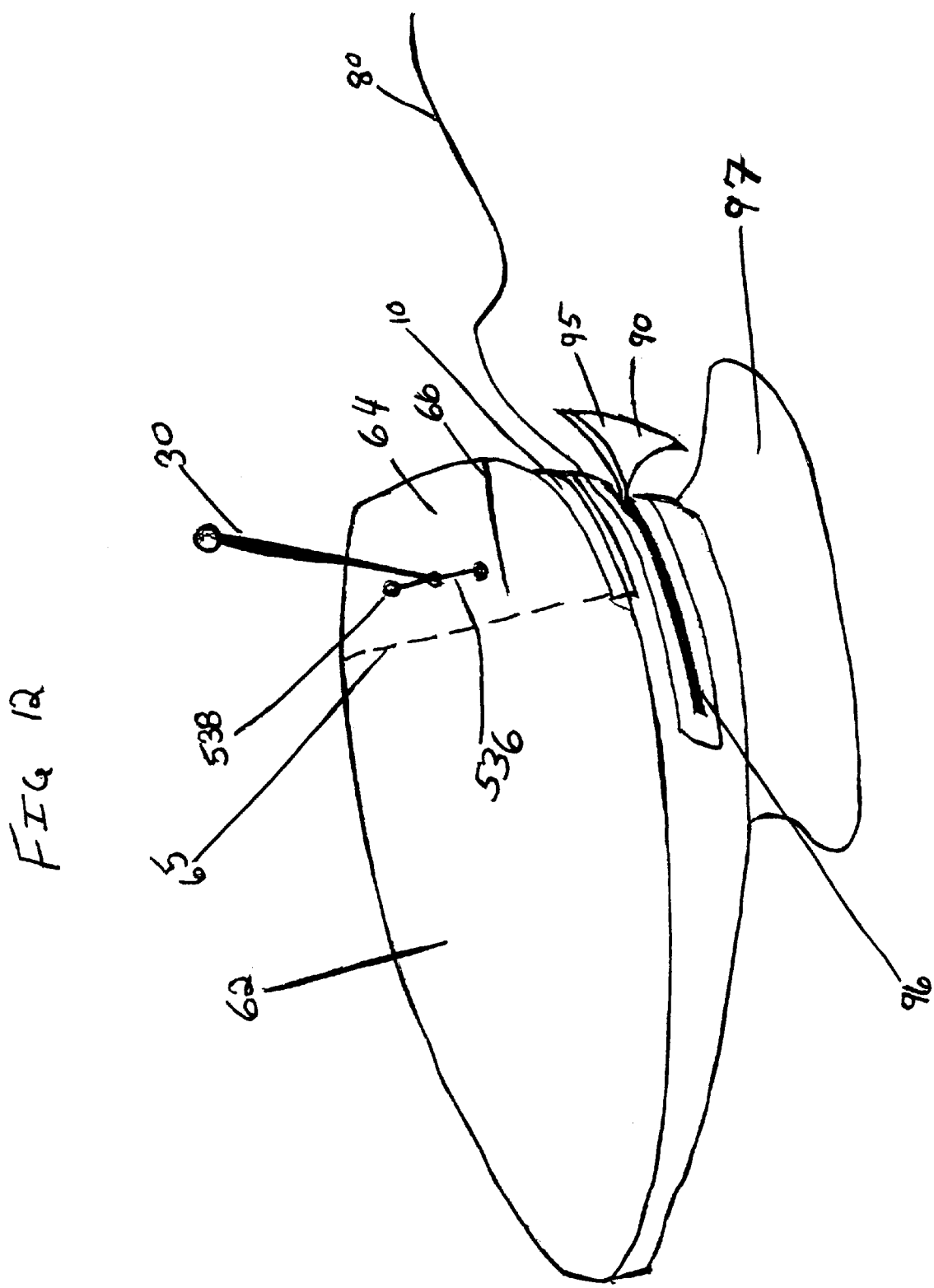

STICK TO ERGONOMICALLY MANIPULATE MOUSE BUTTONS

CROSS REFERENCE TO RELATED APPLICATIONS

This application is a continuation-in-part under 35 U.S.C. §120 from U.S. patent application Ser. No. 09/330,917 filed on Jun. 11, 1999, now U.S. Pat. No. 6,417,842 which is incorporated herein by reference for all purposes. Further priority is claimed under 35 U.S.C. §119 from pending U.S. Patent Application Ser. No. 60/172,089 filed Dec. 23, 1999, and pending U.S. Patent Application Ser. No. 60/233,695 filed Sep. 19, 2000, which are incorporated herein by reference for all purposes.

TECHNICAL FIELD OF THE INVENTION

The present invention relates to the field of ergonomics in the computer industry, and more specifically to a device that aids in reducing user strain, fatigue, discomfort, and pain when operating a computer mouse.

BACKGROUND OF THE INVENTION

Since the advent of the computer, the interface between the user and the computer has remained essentially stable. A typical computer comes equipped with a keyboard and a mouse as a means of controlling the computer and entering data. The prevalence of computers and the amount of usage have led to repetitive strain injuries (RSI).

The cursor control and selection of data and objects by a pointer is accomplished through a mouse, trackball, touch pad, and digitizing tablet, however the mouse is the most common. The computer mouse is used to move a cursor on the monitor and has one or more operational buttons for other functionality. The typical mouse has two or three buttons. The mouse housing rests on a horizontal surface and sensors in the mouse detect the movement of the mouse across the surface. Various mouse designs are being manufactured with varying shapes and configurations.

These buttons perform various functions, such as grabbing data or objects and dragging them to another location, manipulating menu driven applications, and invoking new applications. The buttons may pull down menus for additional commands. The operator control of the buttons usually requires the user to leave a finger on at least one button, maintain pressure on a button for drag operations, and multiple fast clicking. Graphic design and computer artwork requires precision mouse control. The Internet has increased the applicability of mouse operations, and more mouse click manipulations are required for 'point and click' websites.

Repetitive strain injury refers to the many ailments associated with repetitive motions and static pressure, and excessive wear and tear on the soft tissues on the body, namely tendons and nerves. Other terms related to RSI include Cumulative Trauma Disorder, Musculoskeletal Disorders, Occupational Overuse Syndrome, Repetitive Motion Injury, Upper Extremity Musculoskeletal Disorder, and Work-Related Upper Limb Disorders.

Persons that work with computers for extended periods of time can develop inflammations, such as Tenosynovitis (an inflammation of the tendon sheath), Tendonitis (an inflammation of a tendon), Epicondylitis (an inflammation of the tendons where they attach to the elbow bone), Carpal Tunnel Syndrome (a condition where the median nerve does not function properly), Cubital Tunnel Syndrome (compression of the ulnar nerve where it passes the elbow), and Thoracic Outlet Syndrome (affects the neck and shoulders).

Those that do experience RSI are likely to have symptoms such as tightness, soreness, aching, throbbing, sharp pain, numbness, tingling, burning, swelling, and loss of strength in the upper extremities. Once inflicted, the user can resort to braces, splints and repositioning devices to ease the pain. Surgery has been tried with varying results. However, none of the prior devices attempts to address the problem itself-repetition.

Businesses and the economy suffer from RSI due to the loss or lessening of work caused by RSI as well as the expenses associated with equipping employees with ergonomic options. The medical expenses for surgery and therapy is very costly, and is a burden to businesses, medical plans, and individuals. There have even been lawsuits against employers and manufacturers of devices that induced or caused RSI.

The computer mouse is particularly troublesome because the user usually needs to press the same button numerous times while the hand remains in the same position. For some operations, the user must keep a particular button pressed for a varying lengths of time, requiring static pressure. The functionality and usage of the computer mouse has increased dramatically as society has adopted more click intensive applications. Most mice allow single and double clicks to invoke different activities. Most times the clicks have to be in a rapid succession within a small time interval. Users can also manipulate webpages on the Internet, drastically elevating the usage and frequency of mouse operations.

Drafting and drawing applications are another area where mouse operations require mouse intensive manipulations. The mouse buttons are used to draw lines and the user typically depresses and holds buttons while drawing. Precise control of the cursor is important for computer graphics.

There have been a variety of ergonomic keyboards and mice that are designed to lessen RSI. These devices are additional accessories or new designs that must replace the existing units and generally are more expensive than the standard devices. These units have not had much commercial success.

There have been various attempts to relieve the repetition and fatigue associated with computer mouse usage. The implementation of speech recognition in computers, foot-operated mouse designs, and ergonomically designed mice have met with limited success and/or commercial appeal.

In U.S. Pat. No. 5,576,733, a vertically oriented mouse is disclosed, with control buttons located on the slope of the mouse. This design is intended to provide a more natural position to lessen fatigue.

Another ergonomic mouse design is shown in U.S. Pat. No. 4,862,165, having a rounded arched design that is meant to reduce fatigue. There are support pads for the thumb and forefinger, and control buttons can be implemented in addition to or in place of the support pads. Yet another ergonomic mouse design is portrayed in U.S. Pat. No. 5,880,715. This pyramid shape mouse with four triangle-shaped inclined faces has control buttons on the faces. In all these designs the user is still required to perform repetitive motions and static pressure with the same fingers and in the same position.

The invention discussed in U.S. Pat. No. 5,805,143 is for a mouse that has a stylus removably secured to the mouse and which allows the user to operate the mouse in a more artistic fashion. The stylus provides a mechanism to operate the control buttons in a more precise fashion, which is specially tailored to drawing and graphic design. The stylus mount clips-on to the mouse and the stylus is inserted into the mount. The user holds the stylus like a pen or paint brush, and operates the control buttons of the mouse using the stylus. This design is not practical for normal operations, and the user has to maintain static pressure on the stylus during all mouse operations.

An early mouse design is shown in U.S. Pat. No. 4,780,707 that discloses a mouse base that has an opening on the top surface that engages a stylus. The stylus contains the electronics to operate as a mouse independently or in combination with the mouse base. The pen shape device must be held statically during all operations and the control buttons on the stem of the pen unit would still require repetitive motion.

U.S. Pat. No. 5,883,690 is for a removable joystick adapter. The invention uses clips to attach a base piece onto a directional keypad of a video game controller. A joystick is integrated with the base so as to allow the joystick to manipulate the buttons of the keypad. This invention is intended to manipulate keypads via a joystick, which would not be practical for the mouse operations.

Other commercial products have tried to alleviate RSI and related injuries, and there are numerous wrist braces and support structures to maintain ergonomic positioning of the hand. These devices are somewhat cumbersome to use and have not been generally accepted in the software community. Improved commercial mice are continuously entering the market, but all have control buttons as a user interface.

According to recent legislative actions, employers are being pressed to aid in reducing the costly problems associated with repetitive motion injuries. Each year it is estimated that over 1.8 million workers have some form of musculoskeletal injuries related to ergonomics. And, over 600,000 persons miss work because of these injuries. With a cost in the 5 billion range, simple and inexpensive proactive measures will be deployed in every facet of the workplace. There will continue to be increased legislation and litigation to hold companies up to a higher standard of accountability for providing an ergonomic work environment, including adopting better mouse designs.

What is needed are simple and inexpensive means to reduce or eliminate RSI. The prior art devices all strove to create a more ergonomic design, while not addressing the repetition component that causes fatigue and injuries. What is needed is a device that reduces or eliminates repetitive motions and static pressure that lead to fatigue and injuries. This device should be easily installed on existing mice and easily manufactured into future mouse designs. Such a device should be inexpensive and not require purchasing expensive different equipment. It should allow a user to install it onto an existing mouse and be removable or retractable. The device should be compatible with all mouse designs.

SUMMARY OF THE INVENTION

Accordingly, an object of the present invention is to reduce repetitive motion and static loading when using a computer mouse. The present invention allows the user to use different motions and different fingers to operate the mouse buttons. A click stick is used to extend the mouse button operability and allow the user to operate the mouse with much greater ease and flexibility. In a preferred embodiment the invention attaches to the mouse and has hooks for the thumb, pinky and ring finger for moving the mouse. The hooks provide a means for gripping the mouse while also keeping the hand aligned in a relaxed position. The index finger or thumb or other fingers manipulates the stick that triggers the mouse button.

Another object of the invention is to provide a simple and inexpensive device that can be attached to an existing mouse. Many users have become accustomed to their existing mouse design. In one embodiment, the present device is made of plastic and affixes to the mouse by sliding onto the mouse like a sleeve. Additional securing means such as retention screws, parting line guides, or spring-loaded pins are used to retain the sleeve firmly in place on the mouse. In another embodiment, the material for the sleeve is rubber based, similar to the material used to make bottle and can coolers. This flexible material has a greater elasticity and allows the sleeve to slide onto the mouse and securely grip the mouse. A stiffener on the top surface may be used to provide rigidity for the stick as it protrudes upwards from the mouse button.

The device can also be easily fabricated in conjunction with mouse designs, allowing users to continue to use a familiar mouse, but with the additional ergonomic feature of the present invention. Various designs can be used so that the device can be operational on all computer mice. In one embodiment, the click stick is extends from the actuating switch under the mouse button and extends through a hole in the mouse button for the user to operate. The stick can rest on the switch or be affixed. The hole can employ a plastic sleeve or rubber bung to provide the pivot point. In another embodiment the stick is molded directly into the mouse button and extend vertically therefrom. Yet another embodiment attaches the stick through the mouse button using a securing means such as a washer and nut. In this latter embodiment the stick is mounted closer to the front of the mouse button if the mouse uses a hinge assembly on the opposing end.

A further object is to provide a device that is removable or retractable from the mouse so that the user can control the mouse ergonomics and engage or disengage at the user's discretion. Whether the invention is manufactured into the design or is an attachment to an existing mouse, one of the embodiments allows the user to remove or retract the device. Furthermore, the device is adaptable to be used on any mouse button or on a multiple number of mouse buttons. Another embodiment allows spacing so that the mouse buttons can also be manipulated in the usual manner even when the invention is attached.

Another object of the invention is to have a means of advertising on the device. The sleeve or stick could be used to place a company name or logo, or describe some event. The low manufacture costs of the device could make it a unique tradeshow or customer gift that would always bear the presenter's message.

Another object of the invention is a device wherein the stick is held in a position perpendicular to the mouse and requires some force to manipulate the stick. The force required to move the stick depends upon a number of well-known spring dynamics, including the spring material and thickness, spring constant, number of coils, length of spring, and the directional force used to move the spring. There are other means to provide spring functionality without actually using a spring, including using a rubber bung or an elastic top surface that would tend to force the stick into a vertical position.

In operation, the user pushes the stick in any direction, which operates the mouse buttons. The stick is in close contact with the mouse button, typically with a base plate in direct contact with the mouse button. The pivot point for the stick is in the top surface of the sleeve, which is located slightly above the mouse buttons. Any pressure upon the stick in any direction would produce a corresponding force on the button created by the base plate. The dimension of the base plate and the location of the pivot point in some respects determines the degree of force required to manipulate the mouse buttons.

In one embodiment, the stick is secured into a threaded portion in the hole on the top surface of the sleeve above the mouse buttons. Alternatively, a track can run across the top surface of the mouse and the stick can thread into the track at any position along the track, similar to a track lighting system. A sleeve with internal threads may be placed into the hole or a rubber bung can be placed into the hole. The rubber bung would retain the stick without threads and just provide a securing point for the stick. Other variations include a ball joint or other swivel type device that would allow the stick to move more freely. A spring component may be beneficial to maintain and return the stick to a vertical position.

The shape and design of the stick can vary as can the material used for the stick. The stick is plastic in the preferred embodiment, so that the manufacturing costs are minimized. An additional benefit of plastic manufacturing is the ability to design different stick shapes and configurations. The stick could be a rounded rod, a polygonic shapes, or a substantially flat stick. The length of the stick can be preset at an optimal height, or allow the user to cut or breakaway the stick to a custom height. Telescoping and extendable sticks are also possible so that the device can vary depending upon the usage.

The length of the stick is one of the factors that determine the force required to manipulate the mouse buttons. When the stick is inserted into the sleeve device, the majority of the stick protrudes above the sleeve with a small length below the sleeve up to where the plate contacts the mouse button. Just as with a fulcrum and lever, the length of the lever and the position of the fulcrum along the lever establish the force required to produce a resultant force. As the stick is moved slightly, the plate exerts a force upon the mouse button. The flexure of the stick in the sleeve, even when threaded into the sleeve, allows enough resultant force to depress the mouse button.

And yet another object is to provide the stick with a curvature. An arc shaped stick would provide a more secure and restful finger position for the trigger finger or thumb. The stick should allow for easy gripping, and could come with a textured of ribbed surface. The top of the stick could employ a ball or other shape for ornamentation or ergonomic purposes.

Another object is to position the hand in a better orientation for mouse operations. The present invention can use hooks, grips or posts to allow the user to grip and move the mouse easily on a surface while retaining the hand in a more upright and natural position. The pinky finger and ring finger connect to the hooks, which can be of a flexible material and plyable so as to allow the user to shape the hook to an optimal shape. The thumb contacts a hook on the opposing side, and can also use the plyable material.

Yet a further object is to provide a device that increases accessibility for those with arthritis, injuries, disabilities, neurological disorders, birth defects or any general inability to control mouse buttons. The present invention can allow a user to operate the mouse control effectively without finger dexterity. The stick can help improve the computer skills and commercial potential for those having difficulty with standard mice designs.

An additional object of the invention is to manufacture the article from plastic or similar synthetic material that can be easily molded and cost-effectively manufactured. The entire assembly can be plastic and although the device can be installed onto existing mice, manufacturing the device into new mice provides a more efficient means of disseminating the benefits of the device as well as increasing the methods of attaching and variations in the design of the stick. The stick and/or sleeve can include a company logo or other advertisement. This use of the device could be used to promote and advertise various organizations and services. The width and height and shape of the stick and/or sleeve can be varied to accommodate any reasonable length of advertisement, logo, or character.

One object of the invention is an ergonomic mouse apparatus for manipulating a computer mouse, comprising a sleeve attachable to a front end of the computer mouse wherein the sleeve engages the computer mouse. There is a stick having an operator end and a mouse button end, the operator end extending substantially perpendicular to one or more mouse buttons of the computer mouse wherein the stick pivotably engages the sleeve, and wherein the mouse button end interacts with one or more of the mouse buttons by applying pressure to the mouse buttons when the stick is displaced.

A further object is an ergonomic mouse apparatus, wherein the stick has a spring means for returning to a substantially vertical position after being displaced.

Additionally, an object includes an ergonomic mouse apparatus, further comprising a thumb hook extending from a side of the computer mouse. Also, an ergonomic mouse apparatus, further comprising a one or more finger hooks extending from a side of the computer mouse.

Another object is an ergonomic mouse apparatus, wherein the stick engages a track and is adjustably secureable within said track.

Yet a further object is an ergonomic mouse apparatus, further comprising a base plate on the mouse button end of the stick wherein said base plate engages the mouse buttons.

Furthermore, there is an ergonomic mouse apparatus, wherein the sleeve is a cup attachable to one or more mouse buttons of the computer mouse wherein the stick pivotably engages the cup.

An object includes an ergonomic mouse apparatus, further comprising a stick attachment rotatably connecting to the stick.

An object of the invention is an ergonomic mouse apparatus for manipulating a computer mouse, comprising a plate attachable to an upper surface of the computer mouse wherein the plate has a rear section, a front section and a hinge section therebetween, and the front section is flexibly cantilevered over one or more mouse buttons. There is a stick for operating the mouse buttons with an operator end and a mouse button end, with the operator end extending substantially perpendicular from the front section, wherein the front section has a means of pivotably engaging the stick, and wherein the mouse button end interacts with the mouse buttons by applying pressure to the mouse buttons when the stick is displaced.

A further object is an ergonomic mouse apparatus, further comprising a stabilizer guard, wherein the guard is a protrusion extending from a side of the mouse and on a same plane as a bottom surface of the mouse. The stabilizer guard provides a resting place for the hand and allows the hand to slide along the mouse pad.

Another object is an ergonomic mouse apparatus, further comprising a track on a side of the computer mouse for slidably engaging the stabilizer guard.

Yet an additional object is an ergonomic mouse apparatus, further comprising a track on a side of the computer mouse for slidably engaging a finger hook. The finger hook includes a thumb, ring finger, index finger or any combination thereof.

Additionally, an ergonomic mouse apparatus, wherein the stick comprises a rotatable base plate, a middle section extending through and pivotably engaging the front section, a planar shaped top portion, and a topmost stick part further extending from the planar shaped top part. The entire planar shaped stick can be slidably engageable with the plate.

An object includes an ergonomic mouse apparatus, further comprising a plurality of spacers between the computer mouse and the plate to elevate the plate above the mouse.

An integrated ergonomic mouse apparatus for manipulating a computer mouse, comprising a stick assembly with an operator end and a switch end, wherein the operator end extends substantially perpendicular from an opening of a mouse button, and wherein the switch end engages a switch. There is a means of triggering the mouse button by displacing the stick wherein the stick displaces the switch.

Additionally, an integrated ergonomic mouse apparatus for manipulating a computer mouse, further comprising a post connecting to the mouse button and interacting with the switch such that displacing the mouse button displaces the switch.

A further object is an integrated ergonomic mouse apparatus for manipulating a computer mouse, further comprising a spring means for retaining the stick in a substantially vertical position once displaced.

Another object is an ergonomic mouse apparatus, further comprising a stick attachment rotatably connecting to the stick.

A final embodiment that is within the scope of the invention is to fabricate the entire functionality of the ergonomic mouse device as a unitary apparatus, including the top assembly and the thumb/finger side-piece. The entire invention can be molded during fabrication to produce the mouse with the elements included. Such an injection molding process is an inexpensive means to fabricate new mice with the ergonomic attributes. Alternatively, a single molded piece with the top assembly and thumb/finger side element can also be fabricated to accommodate existing mice.

Still other objects and advantages of the present invention will become readily apparent to those skilled in this art from the following detailed description, wherein only a preferred embodiment of the invention is described, simply by way of illustration of the best mode contemplated for carrying out the invention. As will be realized, the invention is capable of other and different embodiments, and its several details are capable of modifications in various obvious respects, all without departing from the invention.

BRIEF DESCRIPTION OF THE DRAWINGS

The present invention will be readily understood by the following detailed description in conjunction with the accompanying drawings, wherein like reference numerals designate like structural elements, and in which:

FIG. 9A shows the plate as a unitary structure that is one-piece without a hinge, wherein the functionality of the hinge is accomplished via the flexing properties of the material used to form the plate FIG. 9B shows the trigger with an L shaped attachment that pivots about the stick FIG. 10A is a cut-away side view that demonstrates a snap-in trigger assembly that has a base plate on the lower end that contacts the mouse button and passes through the plate and expands into a mouse-shaped plane with the stick extending from the surface

DESCRIPTION OF THE PREFERRED EMBODIMENT

To those skilled in the art, the invention admits of many variations. The following is a description of preferred embodiments and variations, offered as illustrative of the invention but not restrictive of the scope of the invention. This invention is a modification to a computer mouse to relieve repetitive motions and otherwise add flexibility and ease to mouse clicking operations.

Figure 1:
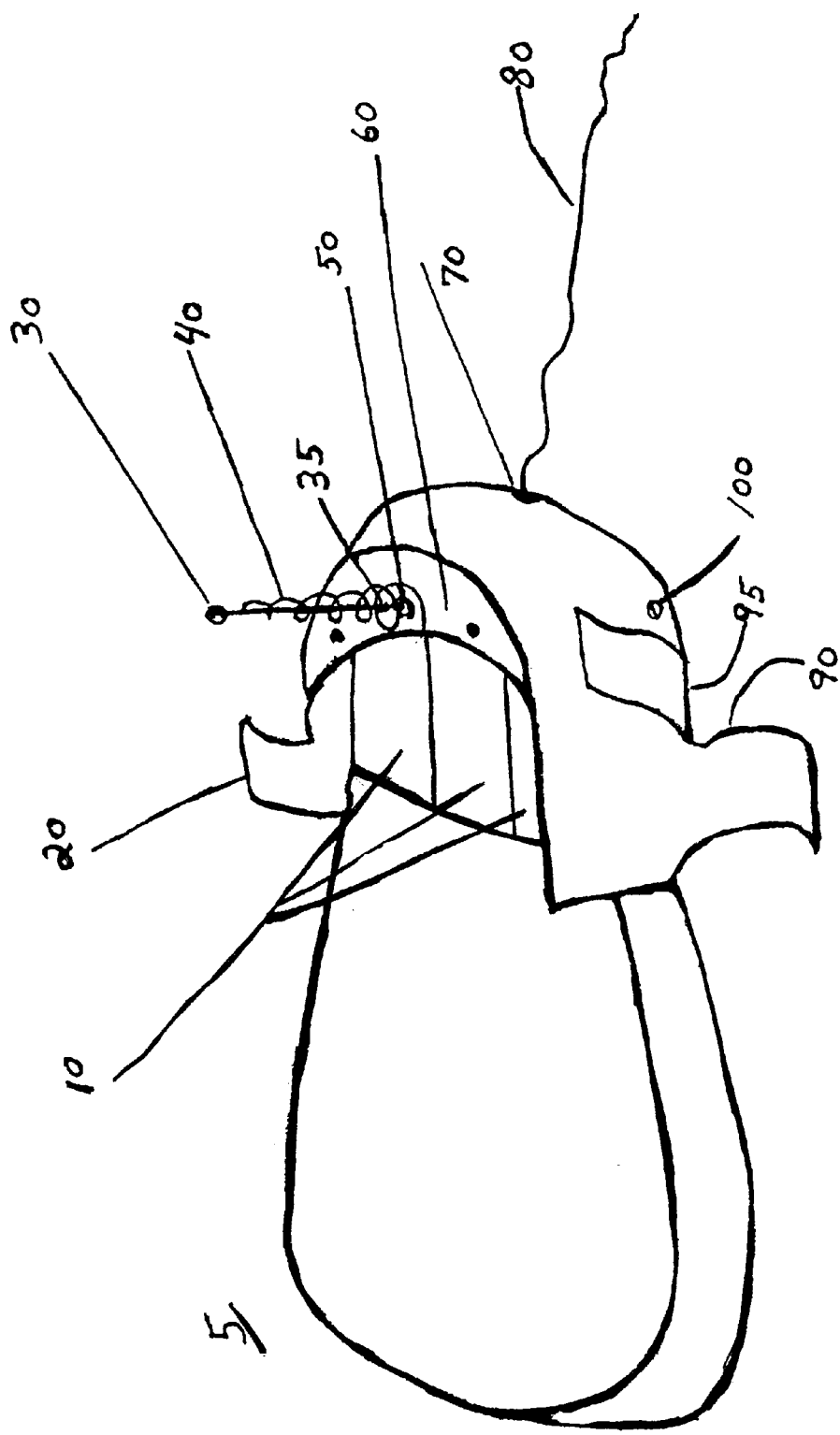
FIG. 1 is a side elevation view of the sleeve embodiment attached to the mouse

FIG. 1 is a side view perspective wherein the sleeve device 60 engages the mouse 5 and is secured to the mouse 5 so that there is little or no independent movement of the sleeve 60. The electrical connection to the mouse 5 is through the wire 80, and the sleeve 60 is notched or has a slit or hole to accommodate the wire 80, and allows the electrical wires 80 to connect from the mouse 5 to a computer (not shown). The present invention also works with other mouse devices that are wireless. In this embodiment a standard three-button mouse 5 is shown with clicker buttons 10, and the right-handed sleeve 60 is depicted.

The sleeve 60 has an opposing hook or thumb hook/post 20 that is designed for the right hand thumb of the user, so that the curved surface of the opposing hook 20 retains the thumb when operating the mouse 5, such as when the stick 30 is operated by the index finger. Although the right hand version is illustrated, the elements are reversable in left-handed models.

On the right hand side of the sleeve 60, there are additional finger hooks 90 and 95. These finger hooks 90, 95 are flexible and bendable to fit different size finger and for shaping to a user preference. The hooks 90, 95 tend to provide a gripping-place for the pinky finger and/or the ring finger. The upward curved hook 95 is substantially a vertical support for either the ring finger or middle finger. In the preferred embodiment, the hooks 20, 90, 95 provide gripping positions for the fingers. There are various other embodiments wherein the sleeve device 60 is operated without with any combination or none of the hook units 20, 90, or 95. The hooks 20, 90, 95 are plastic in the preferred embodiment, but a plyable hook that can be shaped according to the user's individual shape is within the scope of the invention. Plastic coated metal or similar material is well known in the industry and readily adaptable for the present purposes.

The sleeve 60 is preferably plastic and designed to snugly fit the width of the average mouse. If the sleeve 60 is matched to a particular mouse design, the sleeve 60 can be manufactured to slide onto the button portion of the mouse 5 and be held in place by the tight-fitting side portions of the sleeve 60. It is also possible to use the parting lines of the mouse 5 as retention means to aid in securing the sleeve. In one embodiment, a retention screw 100 is positioned on one or both sides of the sleeve 60 and when tightened would firmly secure the sleeve 60 to the mouse 5. Spring-loaded set pins are also within the scope of the invention to secure the sleeve 60 to the mouse 5. The bottom of the sleeve 60 is designed so not to interfere with the normal operations of the ball unit on the underside of the mouse 5. It is obvious that the invention can be attached in a variety of ways or built into the mouse design.

The nose of the sleeve 60 is shaped to conform to the mouse design so that it mates properly with the mouse 5. The sleeve or housing 60 slides over the front mouse buttons 10 and forms a substantially flat top plate. In the illustrated embodiment, the nose of the sleeve 60 is rounded to conform to the mouse 5 and the top surface protrudes approximately ½ inch over the mouse buttons 10. This top surface protrusion allows enough room for the holes 50 to properly secure the stick 30. The side portions of the sleeve 60 extend past the end of the mouse buttons 10 and wrap around the side of the mouse 5. The shape of the sleeve 60 assists in keeping the sleeve 60 snugly secured to the mouse 5 so that slippage is minimized.

Figure 5:
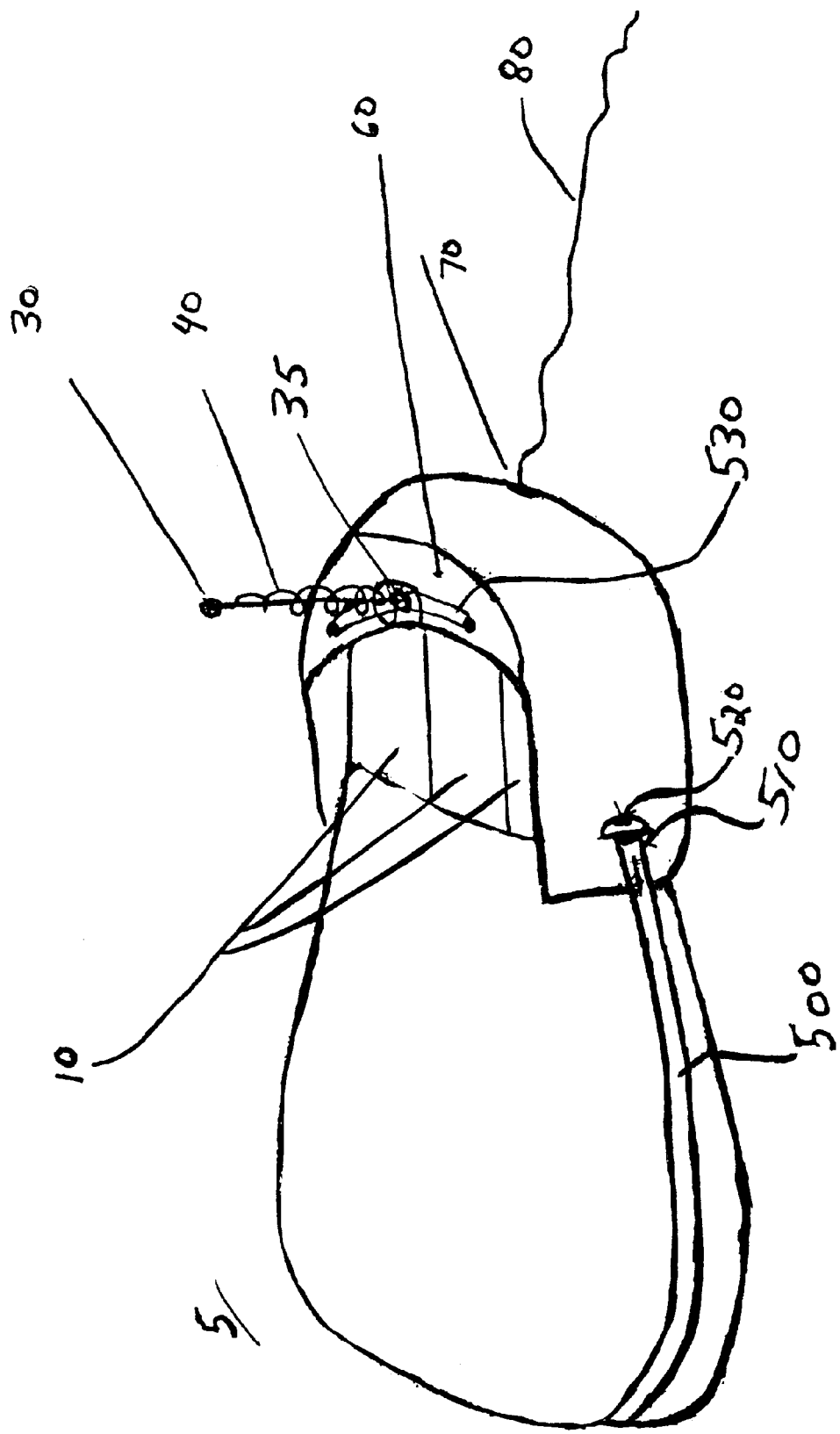
FIG. 5 illustrates an elastic strap securing the sleeve

In one embodiment, a rubber or other highly elastic strap 500 secures the sleeve 60 to the mouse 5 by wrapping around the sides and rear of the mouse 5 as shown in FIG. 5. The strap 500 in this embodiment has a fastener 510 secured on both ends of the strap 500, which engages a post 520 on the sleeve 60 on both sides. Various other attaching means are permissible to secure the strap 500 to the sleeve 60 and are well known in the art. A full mouse wrap design is within the scope of the invention, wherein the sleeve 60 wraps around the sides of the mouse 5 thus firmly securing the sleeve to the mouse 5. Even when attached, mouse bottom and mouse buttons would be open and operable to permit the mouse 5 to otherwise operate in a usual manner.

The mouse buttons 10 are operated via the click stick 30 that protrudes from the sleeve 60. The stick 30 can be positioned in any of the holes 50 in the top portion of the sleeve 60 in order to manipulate any of the mouse buttons 10. In a preferred embodiment, the holes 50 in the sleeve 60 have threaded interior sections so that the stick 30 can be screwed into any of the holes 50 quickly and easily. The threaded section of the holes 50 can be inner sleeves that are affixed to the sleeve 60 to provide a greater number of threads and replacement and repair alternatives. Other means of fastening the stick 30 to the sleeve 60 are possible, including permanent molding and press fit fastening wherein the stick 30 snaps into a mating receptacle. Another variation is to employ a rubber bunghole attachment wherein the stick 30 would be pushed through the bunghole and held in place by the flexible bung.

In a preferred embodiment the stick 30 attaches with a threaded middle section 35 and employs a spring 40 in a preferred embodiment. The threaded section 35 threads through a hole 50 in the top plate of the sleeve housing 60 and extends under the top plate of the sleeve 60. The hole or socket 50 in the top plate of the housing 60 also serves as a fulcrum point for the lever action of the stick 30, and the sleeve 60 has three separate holes 50 over each mouse button 10 in this embodiment to allow the user to use the stick 30 for any mouse button 10. The holes 50 also allows an adjustment means to establish the optimal distance between the stick 30 and the mouse button surface 10. The spring 40 is coil wound and goes from an upper portion of the stick 30 down to the top surface of the sleeve 60. The spring 40 maintains some pressure on the stick 30 to remain perpendicular to the sleeve 60 after each time it is pressed to the side. The length of the spring 40 should be sufficient to provide a prompt return of the stick 30 to the approximately perpendicular position, and several other factors are relevant in determining the length. A variation of the spring design places the spring 40 on the underside of the top surface, extending towards the mouse buttons 10.

Some spring functionality makes the device more ergonomic, however other alternative spring 40 producing implementations that are within the scope of the invention. A flexible top surface that is elastic and permits flexure provides a force to push the stick 30 into the proper orientation. A rubber bung also provides such a force. In some instances, a mouse 5 with much greater spring force could provide the necessary force to return the stick orientation back to approximately perpendicular.

Figure 2:
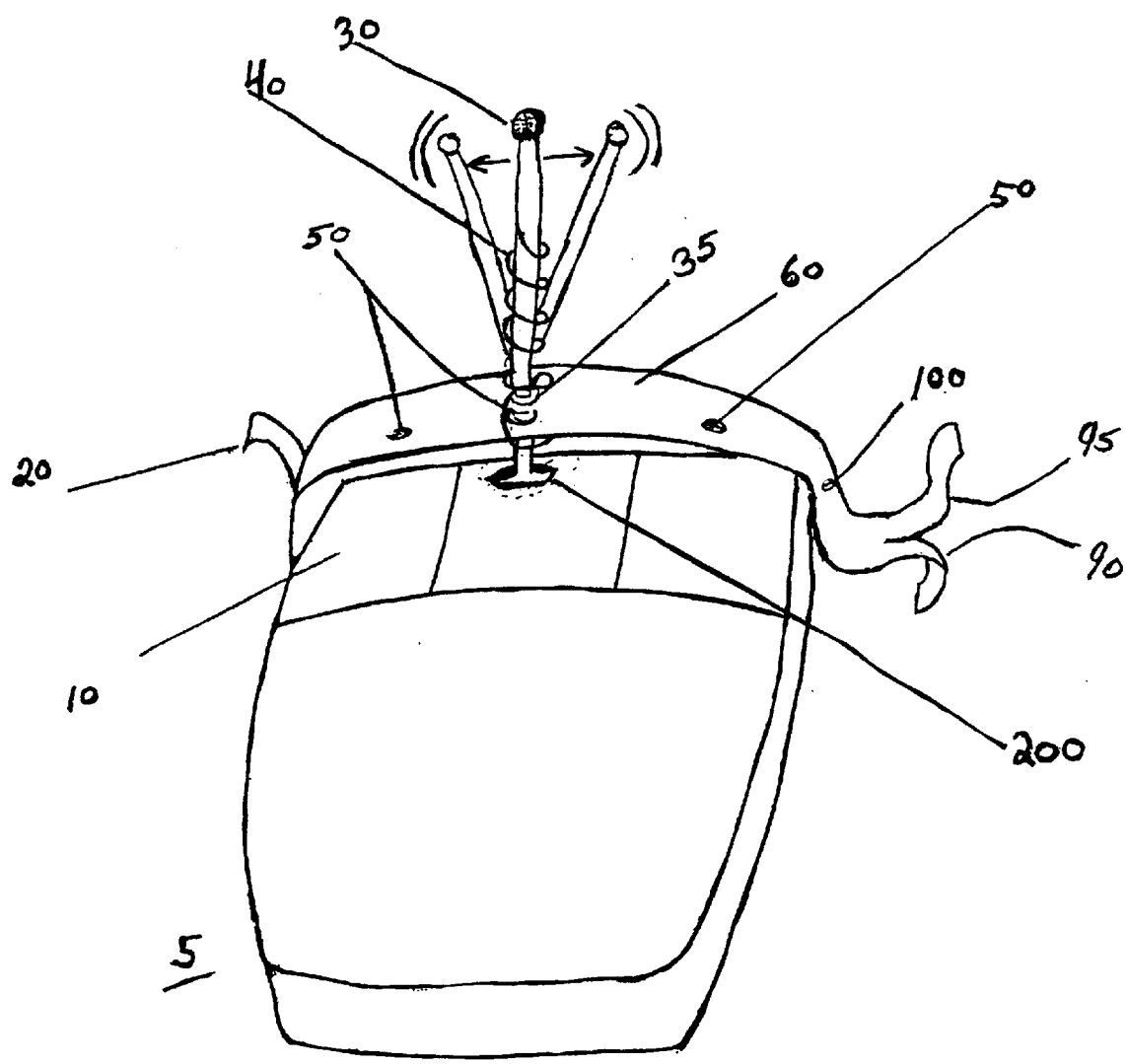
FIG. 2 is a rear elevation view of the sleeve device illustrating the stick contacting the mouse button

FIG. 2 is a rear elevated view of the sleeve 60 illustrating the approximate shape and dimensions of the sleeve and the interaction between the components. In this view it is easier to show the manner in which the mouse buttons are manipulated. The click stick 30 is fastened within the hole 50 and set to the proper height by turning the stick 30 within the threaded hole 50 or insert. In the bung variation, the stick 30 would simply be pushed to the contact point with the mouse button 10.

While this embodiment shows the right hand mouse operation that is typical in the industry, for a left-hand version the opposing hook 20 and the opposing finger hooks 90 are swapped. The sleeve may use plyable hook material in which case the sleeve 60 is generic for any mouse and the user adjusts the hooks. Alternatively, the sleeves can use a track, snap fit, or other engagement mechanisms to place the hooks 20, 90, 95 in the proper position or even make right-handed and left-handed sleeves 60.

The bottom or base plate 200 of the stick 30 interfaces with the mouse buttons 70. The base plate 200 is a rounded head similar to a common sheet metal screw with a flat surface of the screw interfacing with the mouse button 10. As described herein, the stick 30 is adjusted for the optimal interaction of the stick 30 with the mouse buttons 100 for respective pressure or force required to manipulate the buttons 10. The distance between the bottom stick surface or base plate 200 and the mouse button 10 is adjusted by the threaded interface 35. As some force or pressure is applied to the stick 30—either left, right, forward or back—the corresponding fulcrum/lever movement at the lower stick portion 200 presses down on the mouse button 10 thereby clicking the button 10. This embodiment includes a spring 40 or spring-like material or mechanism that promptly returns the stick 30 to the neutral position.

Figure 3:
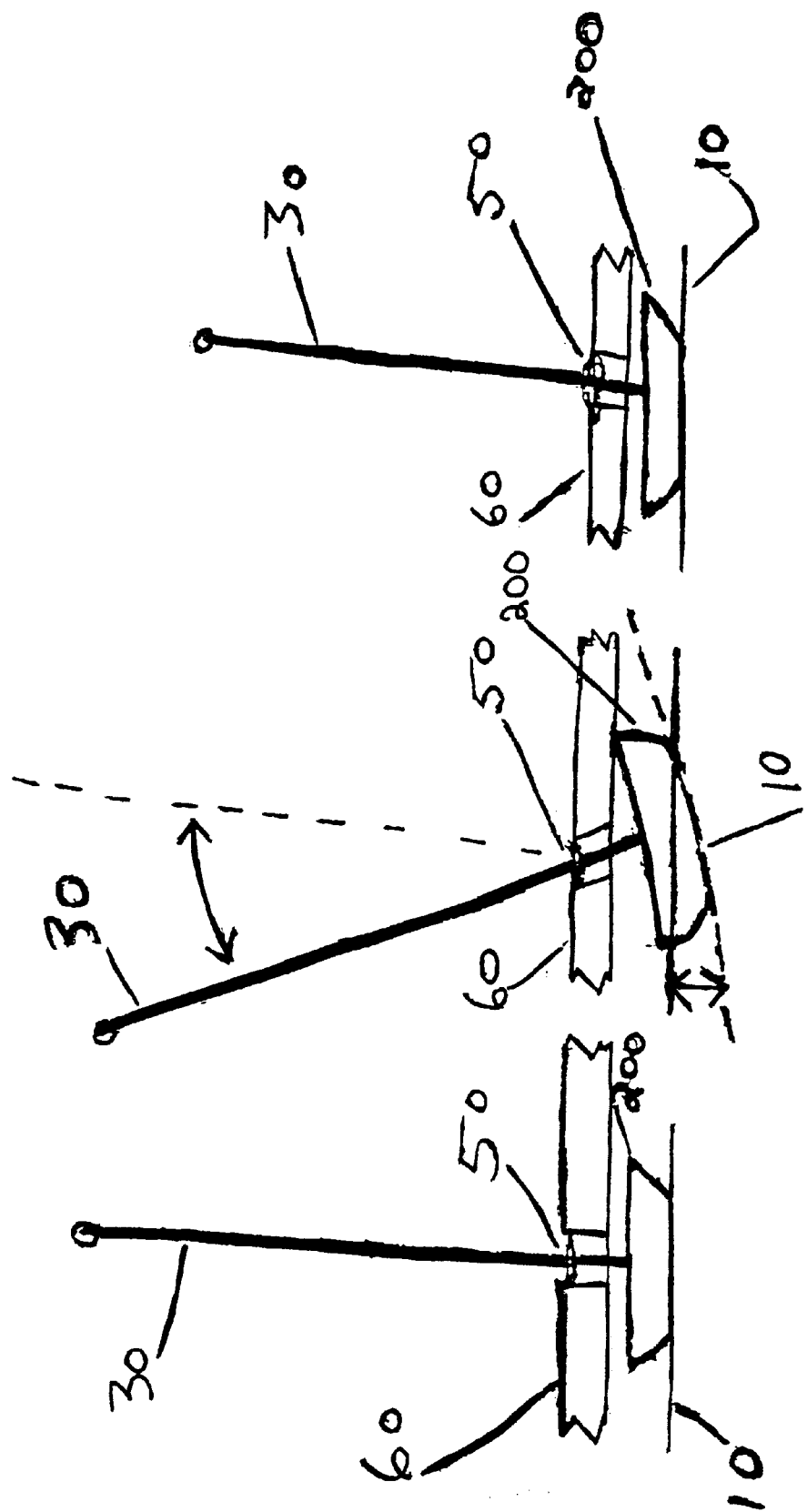
FIG. 3A is a side view of the stick and base plate as attached to a mouse control button shown in the approximately vertical orientation
FIG. 3B is a side view of the stick and base plate as attached to a mouse control button shown when a lateral force is applied to the stick
FIG. 3C is a side view of the stick and base plate as attached to a mouse control button shown returning to the approximately vertical orientation

FIGS. 3A, 3B, and 3C illustrate the lever action of the stick 30 in conjunction with the fulcrum point positioned at the hole 50 of the sleeve 60. These figures illustrate the fulcrum and lever action of the stick 30 and the baseplate 200 as the stick 30 extends through the threaded hole 50 of the sleeve housing 60. FIG. 3A shows the normal resting position of the stick 30 in a substantially perpendicular position to the sleeve 60 and mouse button 10. This is the plane of the surface of the mouse button 10 at rest and in a neutral upright and disengaged position in relation to the stick 30. The base plate 200 is shaped like the head of a screw in a preferred embodiment and contacts or is positioned slightly above the mouse button 10.

When force is applied, from any direction, to the stick 30, a resultant force is applied to the mouse button 10 by the base plate 200 because of the pivot point or fulcrum created by the hole 50 in the sleeve 60. Because the majority of the stick 30 is above the hole 50, and there is a relatively short distance between the hole 50 and the mouse button 10, a relatively small force or movement of the stick 30 produces a greater resultant force on the mouse button. FIG. 3B shows the stick 30 pressed to the left and the corresponding downward movement of the plane of the mouse button 10. The mouse button 10 is depressed via the stick 30 being pressed to the left and the subsequent lever action on the bottom base plate 200.

FIG. 3C illustrates the plane of the surface of the mouse button 10 returned to the neutral or original position as the spring enhanced stick 30 that is returned to the neutral and disengaged position.

Figure 4:
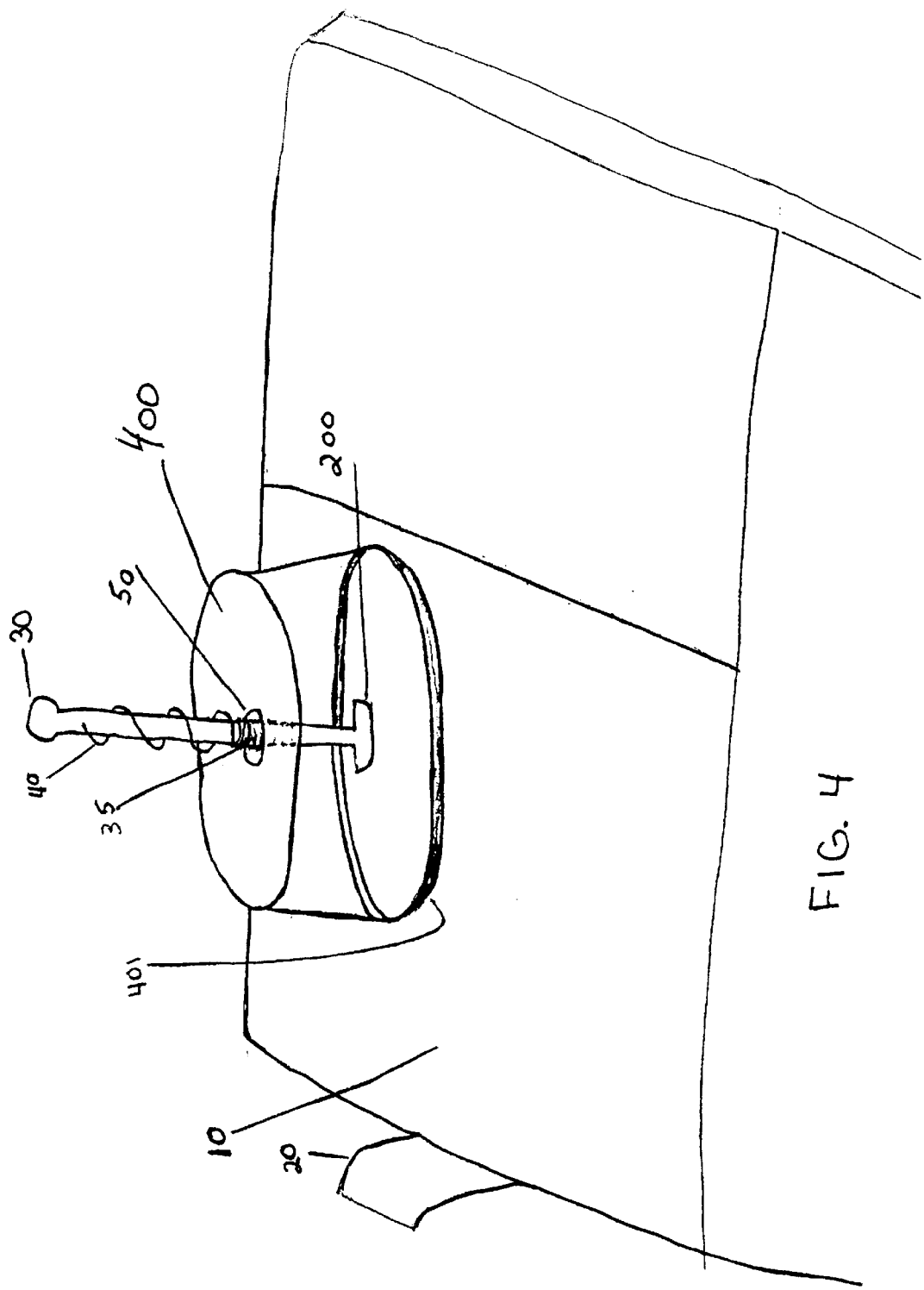
FIG. 4 shows one embodiment wherein the device attaches to a single button

A single button embodiment is shown in FIG. 4, where a plastic cup or frame 400 with the stick 30 is secured to a single mouse button 10. The rim of the cup 401 is secured to the button 10 by an adhesive that allows the cup 400 to be removed and attached at the user's discretion. There are many adhesives suitable for such tasks, including the adhesives used on certain mail advertisements. The stick 30 reacts as previously described, wherein force on the stick 30 applies respective force to the mouse button 10 by the base plate 200. Alternatively, the entire unit 400 could be a suction cup with the stick 30 protruding down the center of the suction cup and engaging the mouse button 10. Any thumb or finger hooks 20, 90, 95 exist independently of the single button cup or frame 400.

FIG. 5 shows a simplified version of the present invention, wherein the sleeve 60 slides onto the mouse 5. The material of the sleeve 60 can be a microcellular foam, rubber or plastic that has enough elasticity to firmly secure the sleeve 60 to the mouse 5. An elongated track 530 across the sleeve 60 provides a slidably engageable stick 30, wherein the stick 30 can be affixed at any point along the track 530. The stick 30 can simply screw down using the track 530 as a threaded member. The top portion of the sleeve 60 can also include a stiffener (not shown) on the underside of the sleeve 60 or otherwise thicker sleeve material to provide support for the track 530 to enable the pivot action required for operation. In this embodiment a rubber strap 500 secures the sleeve 60 to the mouse 5 and designed so that it does not interfere with mouse operations. The strap 500 uses a fastener 510 to attach to the sleeve hole 520 and runs around the mouse 5 to the opposing side and is secured in a similar fashion. The sides and top surface of the sleeve 60 are spaced away from the mouse buttons 10 to provide full operational functionality without using the present invention even when attached.

The present invention increases the accessibility for disabled people and allows easy mouse manipulation. Under the American Disabilities Act (ADA) and OSHA guidelines, computer accessibility is a major thrust, and the present invention aids in allowing those with less dexterity to manipulate mouse buttons which is essential in the 'point and click' environment of the Internet.

Although there are many different mouse design on the market, many of the dimensions are approximately the same. The dimension of the button portion of the IntelliMouse by Microsoft is approximately two inches in width and ¾ inches in height. Many mice have curved designs and angled mouse buttons, similar to the IntelliMouse. The sleeve 60 of the present invention can be manufactured to fit over any mouse approximately the same dimensions. Other mouse designs could employ retrofit attachments or different size sleeves 60.

Figure 6:
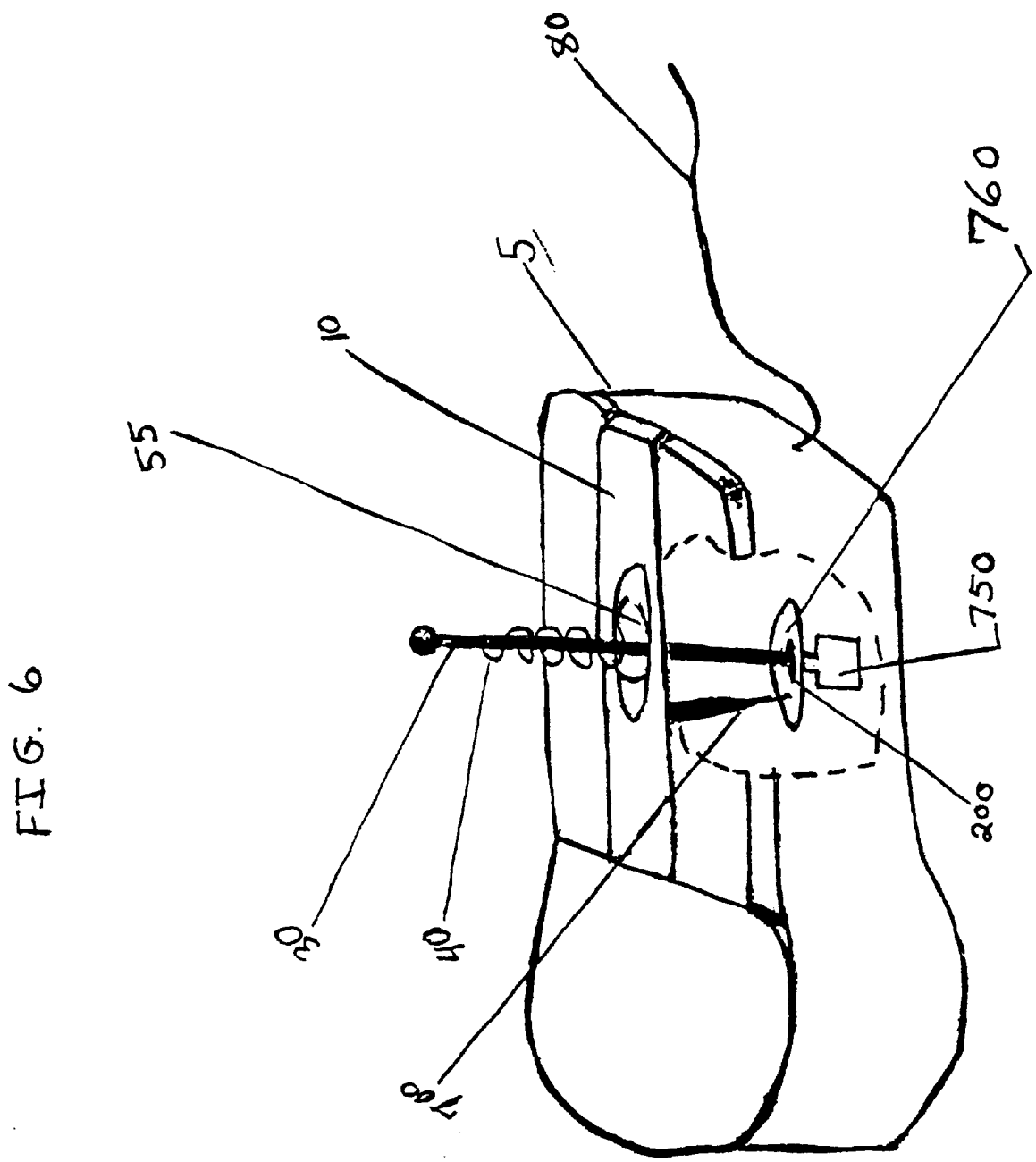
FIG. 6 is an embodiment with the stick interacting directly with the actuator of the mouse button FIG. 7 a user employing the stick device with a thumb hook and pinky hook

FIG. 6 is an embodiment wherein the stick 30 interacts directly with the switch assembly 750. The actuation assembly of a mouse 5 typically has a post assembly 700 extending downwards from the underside of the mouse button 10 and contacting a switch plate 760. The switch plate 760 engages the standard switch assembly 750 that produces the electrical signal indicating a 'click' has occurred. The switch plate 760 allows the mouse button 10 to operate with different directional forces. The stick engages the switch plate 760 by the stick base plate 200.

When the click stick 30 is built in as opposed to an add-on device, the base plate 200 within the interior of the mouse 5 rests on the actuary switch 750 itself. The actuary switch 750 would be the type needed for actuation by either the standard direct downward pressure or the type of downward pressure created by the 'level and fulcrum' action of the base plate 200. In this version, the stick 30 protrudes upwards through a hole 55 in the mouse button 10 itself. The place in the button 10 where the hole 55 is located becomes the fulcrum point (pivot point). The clicking function in this variation can therefore be accomplished in either of two ways: 1) by the usual pressing down on the button 10; or 2) by pressing against the click stick 30 from any side. These function independently of each other and the user can resort back to conventional mouse operations at any time.

In one variation the stick 30 is fixedly attached directly to the mouse button 5 by securing hardware mounted below the mouse button 10. The stick 30 goes through a hole 55 in the mouse button 10 and a washer and nut assembly secures the stick 30 having a threaded lower portion. If the mouse 5 employs a hinge assembly on the inner side of the mouse button, the stick 30 can be located closer to the front of the mouse button 10 to allow mouse manipulation.

Figure 7:
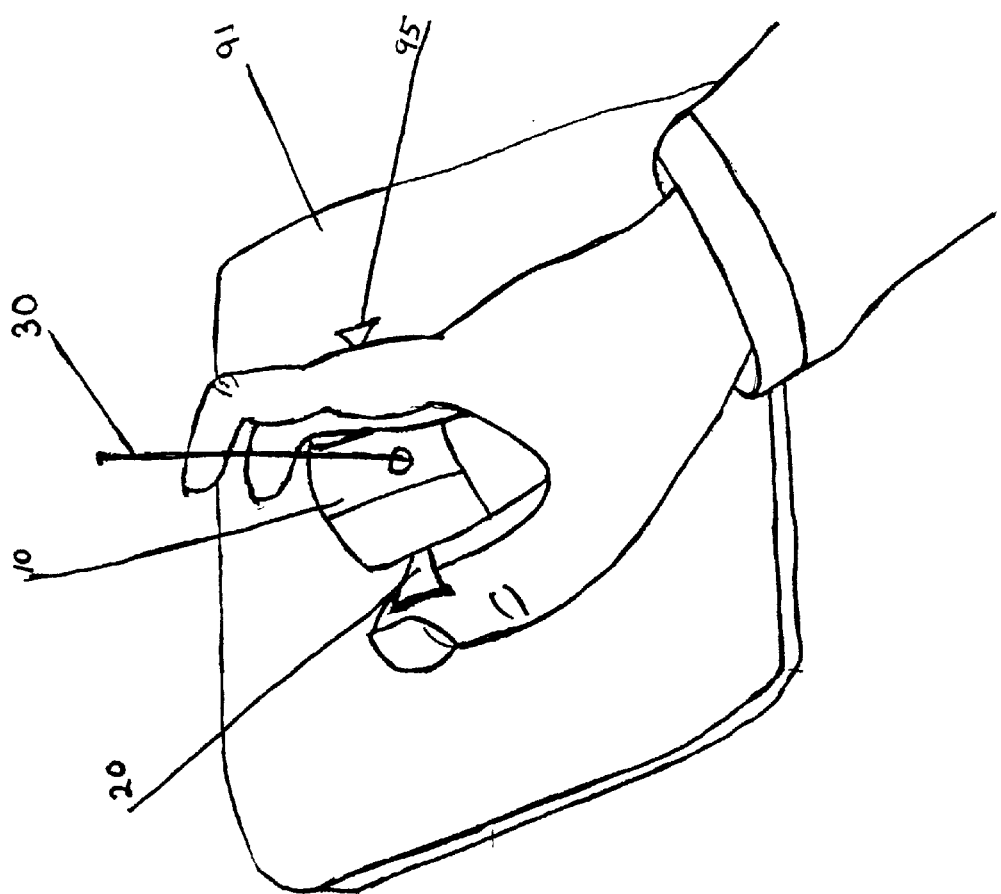

In FIG. 7 the usage is illustrated wherein a user operates the mouse 5 with a pinky hook 95 and a thumb hook 20 to aid in movement of the mouse 5 across the mouse pad 91. The stick 30 extends upwards from the mouse button10 allowing the user to tap the stick 30 to actuate the mouse 5.

Figure 8:
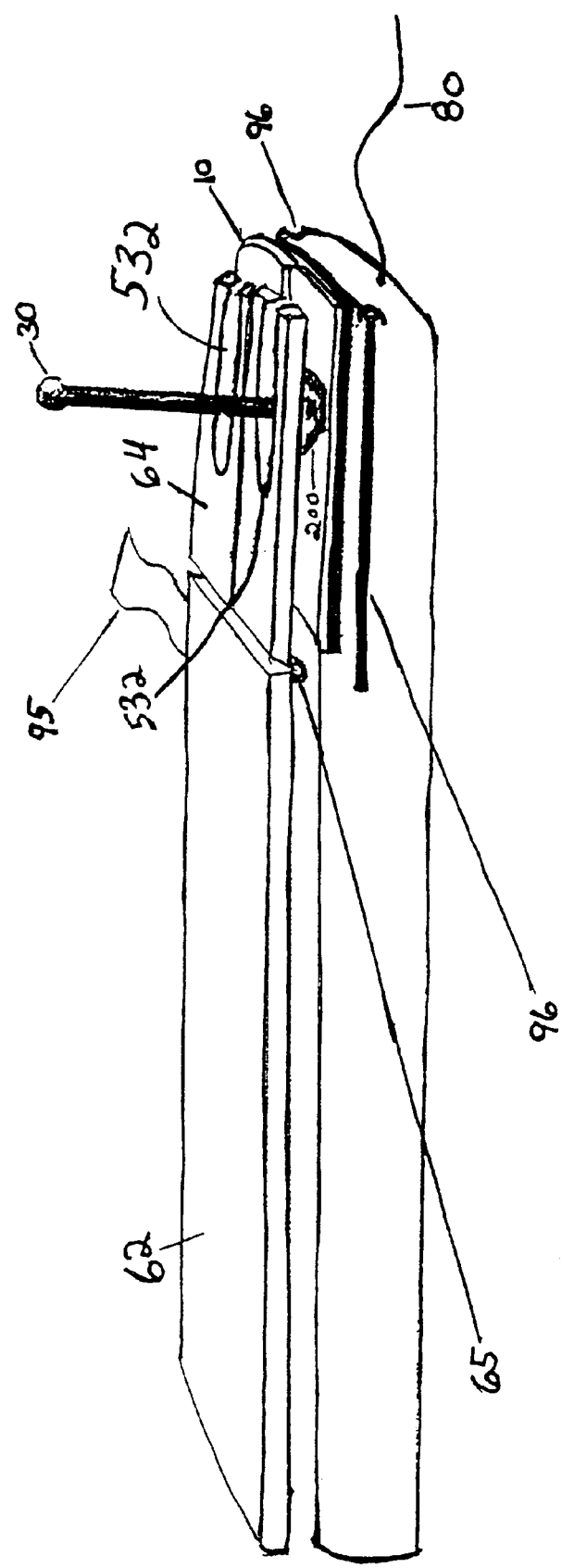
FIG. 8 is a plate on the top of the mouse is used instead of the sleeve, also illustrating a track or slot along the side of the body of the mouse for the finger or thumb hook

A plate variation is shown in FIG. 8, wherein instead of a sleeve connecting at the front portion of the mouse 5, a plate 62, 64 rests on top of the mouse 5 and buttons 10. A track or slot 96 along the side of the mouse 5 towards the front of the mouse engages finger hooks 95, 90. The rear section of the plate 62 generally covers the body of the mouse 5 with a hinged section 65 separating the front section 64. The hinge section 65 allows the downward movement of the front section 64 while the rear section 62 remains substantially unaffected by the movement. The hinge 65 can be a conventional hinge placed on the underside of the plate 62, 64 or utilize the inherent properties of the material making an embedded spring function. Both the underside hinge and the embedded spring function are used to establish the required force to actuate the buttons 10 and set some limits to the range of motion of the front section 64. The limit is required for a stick 30 to actuate a downward pressure at the base 200 when the stick 30 is pulled straight back. Hinges of this type described herein are well-known in the industry, however the hinge can also be implemented using flexible materials for the front section 64.

The track or slot 96 is used for the finger hooks 90, 95 and allows the user to move the finger hooks to a desired location along the slot 96 and then lock he position in the slot 96. The finger hooks 90, 95 can be unlocked, removed or reversed from the slot 96 in the preferred embodiment. The thumb hook assembly 20 slides into the track 96 opposite the finger hooks 90, 95 depending upon the user's preference. The finger hooks 90, 95 and the thumb hooks 20 are separate pieces that are easily switched for right-handed and left-handed persons.

The stick 30 is retained within a track 532 that secures the stick 30 during operation. There is a small space between the front section 64 and the mouse buttons 10 to allow the base plate 200 to cantilever and depress the buttons 10 when a force is applied to the stick 30 in any direction.

The embodiment of FIG. 9A shows the top plate 62, 64 with the embedded material hinge 65 separating the rear section 62 from the front section 64. The rear section of the plate 62 is attached to the mouse 5 with screws 102 and spacers 105 that provide an elevated attachment. There is enough space between the base plate 200 in order to actuate the mouse buttons 10 when the stick 30 is pushed in any direction. The slidably engageable stick 30 resides in elongated tracks 534, wherein the stick 30 is not confined to a single mouse button 10, and in this embodiment there are two 'T' sections 531 that allow the stick to snap into a location along the track 534. The T sections 531 are notches that are perpendicular to the tracks 534 and the stick 30 can be snapped into hole along the T sections 531 providing a variable placement of the stick 30. The front section 64 of the top plate is manufactured of a material that allows the clicking operation yet springy enough to return the neutral position of the stick 30 after use. In this illustration the stick 30 has a curved upper portion 31 that acts as a trigger.

Figure 13:
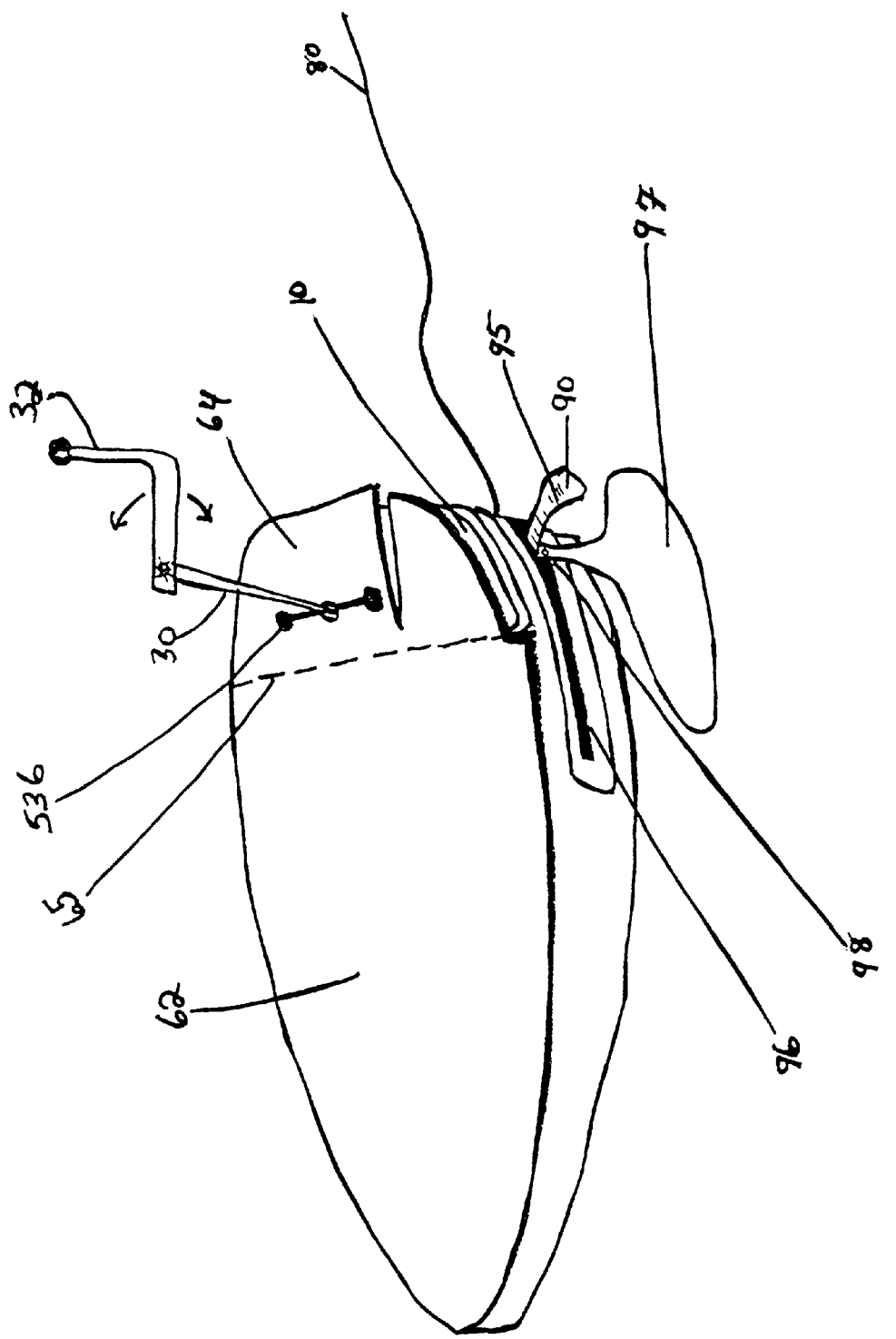
FIG. 13 illustrates another embodiment with a top plate having a rotatable end piece on the stick and with an attached guard assembly

A variation of the trigger 30 is shown in FIG. 9B and FIG. 13, wherein the upper portion of the stick 30 has a captivated 'L' section the is rotatable about the stick 30. This pivoting L piece 32 consists of a small section 33 perpendicular to the stick 30 and then another section 36 extending angularly from the small section 33. The small section 33 is pivotably held in place upon the stick 30 and rotatable about the stick 30.

Figure 10B:
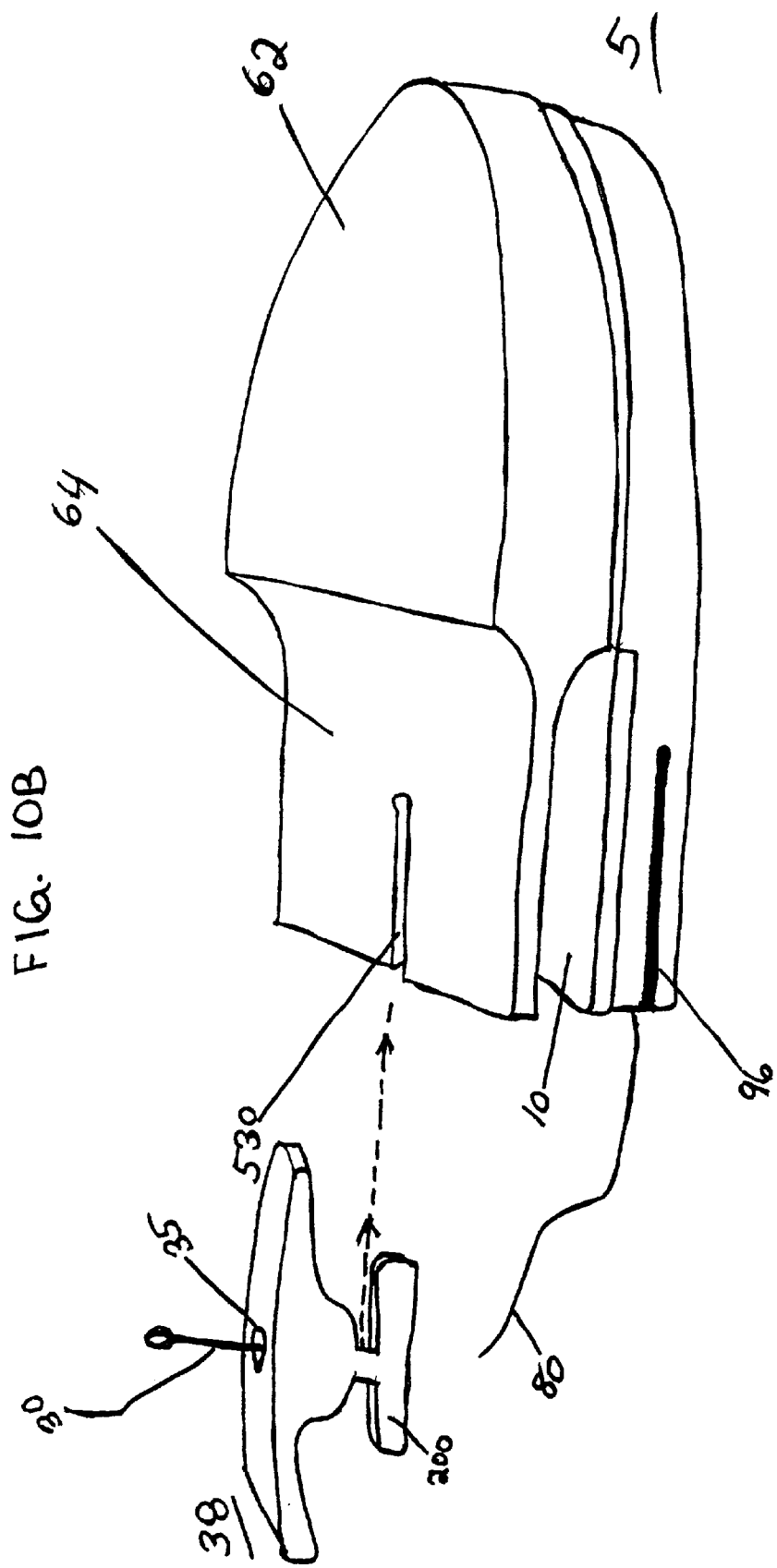
FIG. 10B is an exploded view of the planar assemblies from a top perspective showing the snap-in trigger assembly separated from the mouse and engageable by a slot FIG. 11A side view of a simplified embodiment of the finger hook engaged within a slot on the mouse FIG. 11B front view of a simplified embodiment of the finger hook engaged within a slot on the mouse FIG. 12 demonstrates another embodiment wherein the top plate is an integrated part of the mouse with a slidably engageable finger hook in a track that allows the user to customize the position of the finger hook

FIGS. 10A and 10B demonstrate another variation of the present invention as a snap-in trigger assembly 38 that has a protruding stick 30 and wherein the base plate 200 is an integral component of the device. The cut-away side view of the FIG. 10A shows the stick 30 starting at the base plate extends upwards through the front section of the top plate 64 and expands into a planar shape 38 that from a top perspective resembles the mouse buttons 10. The rear section of the plate 62 is thicker and the front section 64 extends over the mouse buttons with a smaller thickness. The snap-in trigger assembly 38 is shaped as a mouse button on the upper surface with and a flattened top surface having a threaded hole or snap assembly 35 for securing the stick 30 and allowing replacement of the stick 30 and to accommodate different size/shape sticks 30. The snap-in assembly 38 is secured within the track 530 and allows the normal operation of the mouse 5 without the stick 30 and also allow the stick 30 to be deployed and operated. Instead of a track 530, a pivotal hole (not shown) can be used as the means of attaching the snap-in assembly 38 to the plate 64. The thickness of the base plate 200 can be varied to alter the force required to trigger the mouse buttons 10.

FIG. 10B shows one shape of the separate snap-in trigger assembly 38 with the trigger 30 and the baseplate 200 that engages a slot 530. The rear section of the plate 62 is thicker and narrows down towards the front section 64.

Another version of the finger hooks 90, 95 is illustrated in FIGS. 11A and 11B. A single unitary piece is used for the pinky hook 90 and ring finger hook 95. The pinky hook 95 and ring finger hook 90 are slidably engaged within the slot 96 incorporated into the body of the mouse 5. The hooks 90, 95 are attached to the mouse 5 by a small section 98 extending from the slot 96. The pinky hook 90 is the lower hook and is shaped to provide a resting place for the pinky, while the ring finger hook 95 is the upper hook that is shaped to accept the ring finger. Both the pinky hook and ring finger hook are used to help stabilize the mouse and during operation and orient the hand in an ergonomic position for manipulation of the stick 30. The hooks 90, 95 are adjustable in position along the slot 96 and can also be formed from a plyable material that allow user customization. The slots are located on both sides of the mouse 5 and thus adaptable for right or left handed users by moving the hooks 90, 95 to the other side. Although the hooks 90, 95 are respectively labeled the pinky and index finger hooks, these labels are descriptive of the normal user operation and other fingers may be used according to the user preference.

FIG. 12 illustrates yet another variation with the top plate 62, 64 built or manufactured as an integral element of the mouse 5 and utilizing a guard or plate 97. In this right-handed mouse depiction, the right side of the front section 64 is substantially smaller in width than the left side of the front section 64 and the sides are separated by a cut-out or notch 66. The finger hooks 90, 95 are slidably engageable within the track 96 and allow the hooks 90, 95 to be positioned and customized for the comfort of the user. The notch 66 allow the right side portion of the front section 64 to flex and thus the stick 30 that extends from the front section 64 manipulates the buttons 10. The front plate 64 has a stick 30 deployable along a track 536 that runs across a portion of the mouse buttons 10. The track 536 has snap fit holes 538 that retain the stick in that hole 538. This allows the user to alter the button 10 that is operated by the stick 30.

The guard or rest 97 is introduced to the mouse 5 and provide several functions, namely stabilizing the mouse 5 from tipping, providing a resting place for the user's hand to help retain the hand in the proper position, and to alleviate any chaffing of the hand during use. The chaffing occurs when the side portion of the hand continually rubs back and forth across the mouse pad. The guard 97 in this embodiment is an integral part of the mouse 5 housing and extends along the same plane as the bottom of the mouse. The guard 97 can be the same material as the mouse 5 and does not interfere with normal mouse operation.

In FIG. 13, the present invention incorporates variations of previously described embodiments. In particular, the guard 97 is attached to the mouse 5 at the finger hooks 90, 95 attachment. In this manner the guard 97 is adjustable and can have a smaller surface area and still stabilize the mouse 5 and keep the user's hand from chaffing. It also aids in keeping the hand disposed with the thumb pointing essentially upwards, which is the optimal position from an ergonomic standpoint. The stick 30 also employs a rotatable attachment 32 at the top of the stick 30 that allows the user to vary the position of the stick 30. The attachment 32 can be secured by a permanent rivet or via a screw or fastener so that it can be added or removed depending on the user preference.

It is well within the scope of the invention to incorporate existing attachment mechanisms and employ manufacturing and molding techniques to incorporate and operate other embodiments the present invention. The present invention has been particularly shown and described with respect to certain preferred embodiments of features in the written description, figures, and claims. However, it should be readily apparent to those of ordinary skill in the art that various changes and modifications in form and details may be made without departing from the spirit and scope of the invention. Additional objects and advantages of the present invention may be further realized and attained by means of the instrumentalities and combinations all within the scope of the claims. The drawings and description are to be regarded as illustrative in nature, and not as restrictive.

What is claimed is:

1. An ergonomic mouse apparatus for manipulating mouse buttons of a computer mouse, comprising;
    a sleeve attachable to a front end of said computer mouse wherein said sleeve engages a body of said computer mouse;
    a stick having an operator end and a mouse button end, said operator end extending substantially perpendicular to said mouse buttons of said computer mouse wherein said stick pivotably engages said sleeve, and wherein said mouse button and interacts with said one or more mouse buttons by applying pressure to said mouse buttons when said stick is displaced.

2. The ergonomic mouse apparatus according to claim 1, wherein said stick has a spring means for returning said stick to a substantially vertical position after being displaced.

3. The ergonomic mouse apparatus according to claim 1, further comprising a thumb hook extending from a side of said sleeve.

4. The ergonomic mouse apparatus according to claim 1, further comprising a one or more finger hooks extending from a side of said sleeve.

5. The ergonomic mouse apparatus according to claim 1, wherein said stick engages a track on said sleeve and is adjustably secureable within said track.

6. The ergonomic mouse apparatus according to claim 1, further comprising a base plate on said mouse button end of said stick wherein said base plate engages said one or more mouse buttons.

7. The ergonomic mousse apparatus according to claim 1, wherein said sleeve is a cup attachable to one of said mouse buttons of said computer mouse wherein said stick pivotably engages said cup.

8. The ergonomic mouse apparatus according to claim 1, further comprising a stick attachment rotatably connecting to said operator end of said stick.

9. An ergonomic mouse apparatus for manipulating mouse buttons of a computer mouse, comprising:
    a plate attachable to an upper surface of a body of said computer mouse wherein said plate has a rear section, a front section and a hinge section therebetween, and wherein said front section is flexibly cantilevered over said mouse buttons;
    a stick for operating said mouse buttons with an operator end and a mouse button end with said operator end extending substantially perpendicular from said front section, wherein said front section has a means for pivotably engaging said stick; and
    wherein said mouse button end interacts with said mouse buttons by applying pressure to said one or more mouse buttons when said stick is displaced.

10. The ergonomic mouse apparatus according to claim 9, further comprising a stabilizer guard, wherein said guard is a protrusion extending from a side of said mouse and on a same plane as a bottom surface of said mouse.

11. The ergonomic mouse apparatus according to claim 10, further comprising a track on a side of said computer mouse for slidably engaging said stabilizer guard.

12. The ergonomic mouse apparatus according to claim 9, further comprising a track on a side of said computer mouse for slidably engaging a finger hook.

13. The ergonomic mouse apparatus according to claim 9, wherein said stick comprises a rotatable base plate, a middle section extending through and pivotably engaging said front section, a planar shaped top portion, and a topmost stick part further extending from said planar shaped top part.

14. The ergonomic mouse apparatus according to claim 9, further comprising a plurality or spacers between said body of said computer mouse and said plate to elevate said plate above said body.

15. An integrated ergonomic mouse apparatus for manipulating a mouse button of a computer mouse, comprising:
    a stick assembly with an operator end and a switch end, wherein said operator end extends substantially perpendicular from an opening within said mouse button, and wherein said switch end engages a switch of said mouse button; and
    a means for triggering said mouse button by displacing said stick wherein said stick displaces said switch.

16. An The integrated ergonomic mouse apparatus for manipulating a computer mouse, according to claim 15, further comprising a post connecting to said mouse button and interacting with said switch such that displacing said mouse button displaces said switch.

17. The integrated ergonomic mouse apparatus for manipulating a computer mouse, according to claim 15, further comprising a spring means for retaining said stick in a substantially vertical position once displaced.

18. The ergonomic mouse apparatus according to claim 15, further comprising a stick attachment rotatably connecting to said operator end of said stick.

* * * * *